United States Patent [19]

Shioyama et al.

[11] Patent Number: 5,009,838

[45] Date of Patent: Apr. 23, 1991

[54] INTERNAL PUMP FOR NUCLEAR REACTOR

[75] Inventors: Tsutomu Shioyama, Yokohama; Ko Minakami, Kawasaki; Takao Fujii, Yokohama; Koichi Ohtomi, Kawasaki, all of Japan

[73] Assignee: Kabushiki Kaisha Toshiba, Kawasaki, Japan

[21] Appl. No.: 298,596

[22] Filed: Jan. 18, 1989

[30] Foreign Application Priority Data

Jan. 18, 1988 [JP] Japan .................................. 63-6816
Feb. 29, 1988 [JP] Japan .................................. 63-44267
Mar. 28, 1988 [JP] Japan .................................. 63-72061
Mar. 29, 1988 [JP] Japan .................................. 63-73320

[51] Int. Cl.$^5$ .................................................. G21C 19/42
[52] U.S. Cl. ..................................... 376/310; 376/370; 376/377; 376/402
[58] Field of Search ................ 376/310, 370, 377, 402

[56] References Cited

U.S. PATENT DOCUMENTS 4,024,911  5/1977  Forrest et al. ................. 165/107
4,859,401  8/1989  Murase et al. ................. 376/282
4,879,087 11/1989  Akiyama et al. ............... 376/216

FOREIGN PATENT DOCUMENTS 0111024  6/1984  European Pat. Off. .
2511235 10/1975  Fed. Rep. of Germany .
369966  3/1932  United Kingdom .

Primary Examiner—Brooks H. Hunt
Assistant Examiner—Nina Bhat
Attorney, Agent, or Firm—Foley & Lardner

[57] ABSTRACT

A nuclear reactor internal pump has a pump shaft connected to a motor and rotatably passing through the bottom of a nuclear reactor pressure vessel, an impeller fitted to a front end portion of the pump shaft, a diffuser disposed on the downstream side of the impeller and having an inner cylinder fixed to the bottom of the reactor pressure vessel to surround the pump shaft, a purge water passage defined between the pump shaft and the inner cylinder to communicate with the inside of the reactor pressure vessel and a purge water supply device for supplying purge water to reactor pressure vessel through the passage. Further, the nuclear reactor internal pump comprises a clad dropping preventive device for trapping clad coming from the reactor pressure vessel in the passage to prevent the clad from dropping.

22 Claims, 18 Drawing Sheets

FIG.5
FIG.6
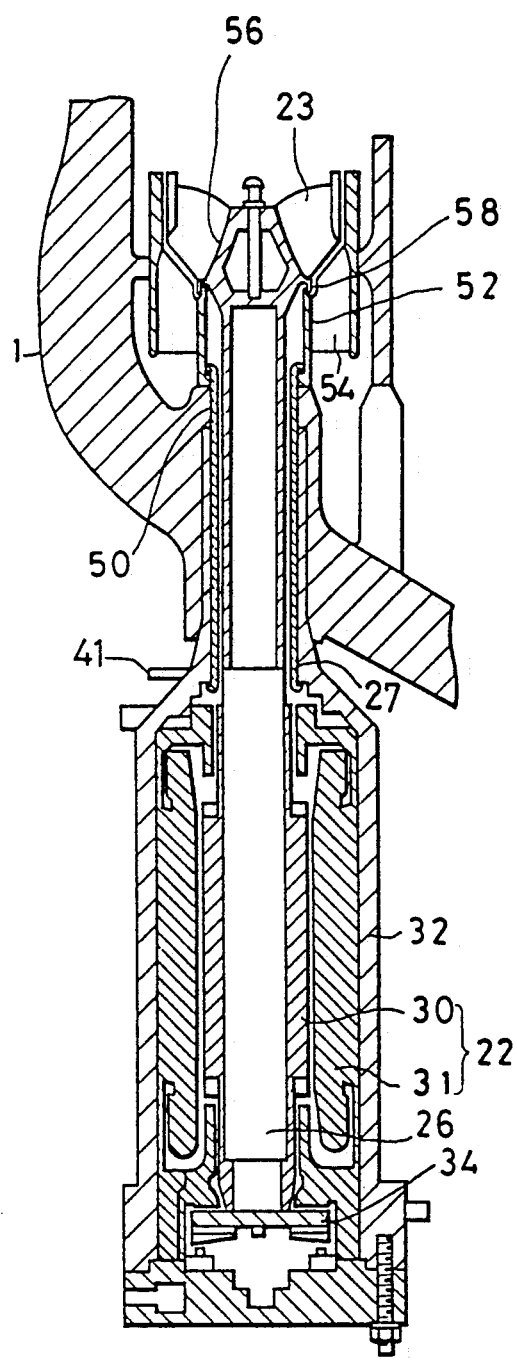
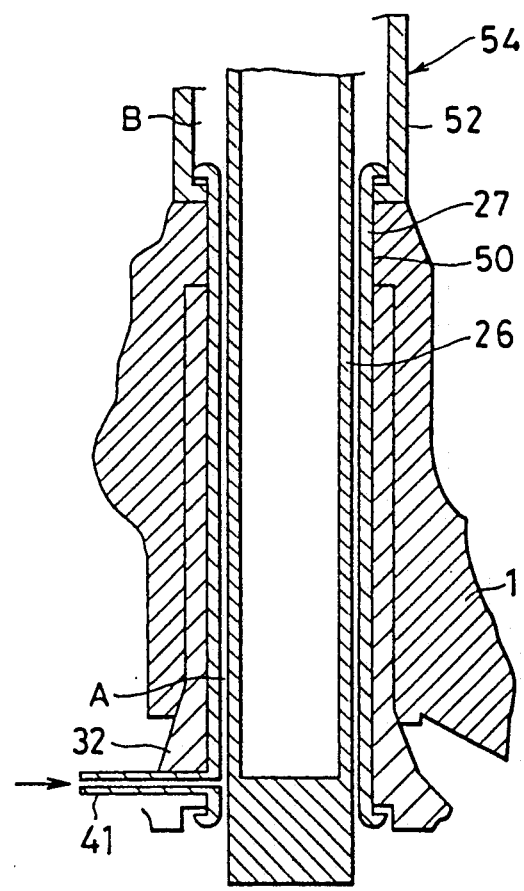

CENTER OF REACTOR CORE →

INTERNAL PUMP FOR NUCLEAR REACTOR

BACKGROUND OF THE INVENTION

1. Field of the Invention

The present invention relates to an internal pump adopted for an internal pump type boiling water reactor (hereinafter called the ABWR); Advanced Boiling Water Reactor), and particularly to an internal pump which is constituted to trap clad that enters the internal pump from a reactor pressure vessel.

2. Description of the Prior Art

A conventional internal pump will be explained with reference to FIGS. 1 to 3.

FIG. 1 is a vertical section schematically showing the ABWR. A reactor pressure vessel 1 accommodates coolant 2 and a core 3. The core 3 comprises a plurality of fuel assemblies (not shown), control rods 4, etc. In the reactor pressure vessel 1, there are arranged a shroud 5, a core support plate 6 and an upper grid plate 7, to support the core 3. The control rods 4 are driven by a control rod driving mechanism 8.

Above the core 3, a steam separator 9 is arranged, and a steam dryer 10 is disposed above the steam separator 9. Below the steam separator 9, a water supply pipe 11 is connected to the reactor pressure vessel 1. The water supply pipe 11 is connected to a water supply sparger 12.

Between the shroud 5 and the reactor pressure vessel 1, a downcomer portion 13 is defined. At a lower part of the downcomer portion 13, internal pumps 14 are circumferentially disposed at regular intervals. The internal pumps 14 forcibly circulate the coolant 2 toward the core 3. A reference mark 15 represents main steam piping.

FIG. 2 shows structure of the internal pump 14. The internal pump 14 comprises a pump section 21 and a motor section 22. The pump section 21 comprises an impeller 23, a diffuser 24 disposed on the discharge side of the impeller 23, a diffuser ring 25, etc. The impeller 23 is connected to the motor section 22 through a pump shaft 26.

At a bottom of the reactor pressure vessel 1, nozzles 1a are arranged to protrude upward. The diffuser 24 is fixed to each nozzle 1a with a stretch tube 27.

The motor section 22 comprises a motor case 32 which accommodates a rotor 30 engaging integrally with the pump shaft 26, a stator 31, etc. A front end portion of the motor case 32 is inserted into the nozzle 1a and welded thereto. Coolant water via piping 33 circulates inside the motor case 32 to prevent the motor section 22 from burning. An auxiliary impeller 34 is fixed to a lower end of the rotor 30. A lower end of the stretch tube 27 engages with a stepped portion formed at an upper part of the motor case 32.

A purge water inlet 41 is formed at an upper part of the motor case 32. Through the purge water inlet 41, purge water is supplied into the motor case 32.

As also shown in FIG. 3, the purge water supplied into the motor case 32 passes through a space A defined between the pump shaft 26 and the stretch tube 27 and flows into a space B defined between the pump shaft 26 and the diffuser 24. By supplying the purge water in this way, contaminated particles in the reactor pressure vessel 1 are prevented from flowing into the motor case 32. At the same time, the purge water cools an upper part of the motor case 32. Due to such a cooling effect of the purge water, despite a high water temperature of about 300 C. in the reactor pressure vessel 1, a temperature inside the motor case 32 is suppressed to about 40 C. As a result, polymeric materials such as a coil insulation material of the stator 31 and a sealing rubber material of a secondary seal are prevented from deteriorating due to the high temperature.

However, the above-mentioned conventional structure of the internal pump has several drawbacks. Clad of large specific gravity generated in the reactor pressure vessel 1 may flow into the motor case 32 against a flow of the purge water. To prevent the clad of large specific gravity from entering the motor case 32, a flow rate of the purge water shall be increased. If the flow rate of the purge water is increased, however, the pump shaft 26 and stretch tube are subjected to a great temperature difference, i.e., large thermal stress to deteriorate soundness of the pump shaft 26 and stretch tube 27.

In this way, the conventional internal pump structure requires a flow rate of the purge water to be increased to prevent the clad of large specific gravity from entering into the motor case. If the flow rate of purge water is increased, however, the pump shaft and stretch tube are subjected to large thermal stress to deteriorate soundness of the pump shaft and stretch tube.

SUMMARY OF THE INVENTION

To solve the problems of the conventional internal pumps, an object of the present invention is to provide a reactor internal pump which is able to prevent clad of large specific gravity from entering into a motor case of the pump without increasing a flow rate of purge water.

Another object of the present invention is to provide a reactor internal pump which is able to prevent clad from entering into a motor case of the pump even if a flow rate of purge water is small or there is no flow of the purge water.

Still another object of the present invention is to provide a reactor internal pump which is able to prevent clad from entering into a motor case of the pump without increasing a flow rate of purge water or even if the flow rate decreases due to clogging of a purge water injection pipe.

According to an aspect of the present invention, a reactor internal pump has a pump shaft which passes through the bottom of a reactor pressure vessel. A top end of the pump shaft is connected to an impeller. A diffuser is arranged on the downstream side of the impeller. The diffuser has an inner cylinder which surrounds the pump shaft. The diffuser is stationary with respect to the bottom of the reactor pressure vessel. Between the pump shaft and the inner cylinder of the diffuser, a purge water passage is formed to communicate with the inside of the pressure vessel. A boss portion of the impeller is provided with a cover portion facing downward. The cover portion extends in the direction of a rotation radius of the impeller to overlap and cover a top end of the inner cylinder of the diffuser. The cover portion allows the purge water to flow while preventing clad from entering into the purge water passage.

Namely, an upper end of the purge water passage formed between the pump shaft and the inner cylinder of the diffuser is covered with the cover portion that is formed on the boss portion of the impeller to overlap the upper end of the purge water passage. Therefore, even if a flow rate of the purge water is small or even if there is no flow of the purge water, it is not possible to enter the clad into a motor case of the internal pump from the reactor pressure vessel through the purge water passage, while the purge water is allowed to flow through the purge water passage.

According to another aspect of the present invention, a reactor internal pump has a purge water passage formed between a stretch tube and a rotor of a motor of the pump and between a diffuser and the rotor. A sectional area of part of the purge water passage is narrowed relative to sectional areas of front and back portions of that part to locally increase the velocity of an upward flow of the purge water to prevent clad from dropping downward from that part. Clad in the reactor is prevented from entering into a motor case of the internal pump with purge water of smaller flow rate compared to the conventional internal pump.

According to still another aspect of the present invention, a reactor internal pump comprises a motor case with its top end inserted into a reactor pressure vessel through a bottom of the reactor pressure vessel; a pump shaft disposed inside the motor case and having an upper end portion disposed inside the reactor pressure vessel; an impeller fixed to the upper end portion of the pump shaft; a diffuser arranged on the discharge side of the impeller; a stretch tube arranged around and space apart from the pump shaft, and whose upper end fixes the diffuser to the reactor pressure vessel; a purge water inlet connected to the motor case to supply purge water into a space between the pump shaft and the stretch tube and into a space between the pump shaft and the diffuser to prevent clad from entering the motor case from the reactor pressure vessel; and a clad dropping preventive mechanism disposed between the pump shaft and the diffuser to trap clad dropping from the reactor pressure vessel to prevent the clad from entering the motor case.

The clad dropping preventive mechanism may be an annular member protruding from either the pump shaft or the diffuser. The clad dropping from the reactor pressure vessel is trapped by the upper surface of the annular member.

The clad dropping preventive mechanism may be annular members protruding from the pump shaft and the diffuser, respectively. Peripheries of the annular members overlap each other to form a winding passage to trap the clad from the reactor pressure vessel in two stages.

In this arrangement, the periphery of at least one annular member may be bent toward the other annular member. The peripheries of both the annular members may be bent such that the peripheries alternate each other. A valve may be disposed between each bent portion and the other annular member.

The bent portions of the respective annular members may again be curved toward each other to narrow a purge water passage between them. All of these modifications are naturally included within scope of the present invention.

The clad dropping preventive mechanism is arranged between the pump shaft and the diffuser to trap the clad dropping from the reactor pressure vessel. The clad is collected by the clad dropping preventive mechanism so that the clad does not enters the motor case of the internal pump. Even if a flow rate of the purge water is small, the clad dropping preventive mechanism can provide the same action and effect. Therefore, unlike the conventional internal pump, the clad dropping preventive mechanism of the prevent invention does not require the flow rate of purge water to be increased in purging the clad of large specific gravity, thus solving various inconveniences that are caused by increasing the flow rate of purge water.

According to still another aspect of the present invention, a reactor internal pump comprises a motor case with its top end portion inserted into a reactor pressure vessel through a bottom of the reactor pressure vessel; a pump shaft disposed inside the motor case and having an upper end disposed inside the reactor pressure vessel; an impeller fixed to the upper end of the pump shaft; a diffuser arranged on the discharge side of the impeller; a stretch tube arranged around and spaced apart from the pump shaft and whose upper end fixes the diffuser to the reactor pressure vessel; and a purge water inlet connected to the motor case to supply purge water into a space between the pump shaft and the stretch tube and into a space between the pump shaft and the diffuser to prevent clad from entering the motor case from the reactor pressure vessel.

Just above the stretch tube, a cylindrical wall of the diffuser is provided with entrances of a plurality of small through holes. The through holes connect the purge water passage to the inside of the pressure vessel outside the diffuser wall, to form clad discharging passages. Each of the through holes is sufficiently small but larger than the size of clad. The clad discharge passages extending from the inside of the diffuser to the outside of the same are horizontal or inclining downward toward the outside of the diffuser. Through the clad discharging passages, clad in the purge water passage is discharged outside the diffuser to prevent the clad from entering the motor case.

To improve a function of discharging clad in the purge water passage to the outside of the diffuser via the through holes, an irregular portion may be provided on the inner wall of the diffuser in the vicinity of the entrances of the through holes to collect the clad in the purge water passage and discharge the clad effectively.

The through holes may be distributed only on the core side of the reactor to increase a pressure difference of the through holes between the inside and the outside of the diffuser wall to improve a clad discharging capacity.

To improve a clad collecting ability of the irregular portion formed in the vicinity of the entrances of the through holes inside the diffuser, an annular projection may be formed. The annular projection is located above the irregular portion and protrudes from the pump shaft into the purge water passage between the pump shaft and the diffuser.

In this way, the diffuser is provided with the clad discharging means to discharge clad dropped from the reactor pressure vessel into the diffuser, to the outside of the diffuser. Since the clad is discharged by the clad discharging means to the outside of the diffuser, the clad never enters the motor case of the internal pump. Even if a flow rate of purge water is small, the same discharging action and effect can be achieved. Therefore, unlike the conventional internal pump, the flow rate of purge water is not necessary to be increased in purging the clad of large specific gravity, thus resolving various inconveniences that are caused by increasing the flow rate of purge water.

According to still another aspect of the present invention, a reactor internal pump comprises a motor having a pump shaft assembled to the bottom of a pressure vessel; an impeller fitted to an end of the pump shaft; a diffuser arranged on the downstream side of the impeller; a stretch tube fitted around the pump shaft to fix the diffuser to the pressure vessel; a fluid passage defined between the pump shaft and the stretch tube to provide communication between the inside of the pressure vessel and the inside of a motor case. The reactor internal pump further comprises a swirling flow control means which will generates an upward swirling flow of fluid in the fluid passage in response to rotation of the pump shaft.

When the pump shaft is rotated, the fluid filling a space between the pump shaft and the stretch tube swirls around the pump shaft due to friction against the surface of the pump shaft. At this time, spiral projections, vanes or grooves formed on the surface of the pump shaft act as rotary vanes to provide upward driving force to the swirling flow around the pump shaft. Therefore, a flow of the fluid (purge water) is always an upward flow to push clad which tries to enter the space between the pump shaft and the stretch tube from the pressure vessel, back into the pressure vessel.

These and other objects, features and advantages of the present invention will be more apparent from the following detailed description of preferred embodiments in conjunction with the accompanying drawings.

BRIEF DESCRIPTION OF THE DRAWINGS

FIG. 5 is a vertical section generally showing the internal pump of the first embodiment;

FIG. 6 is an enlarged vertical section showing the vicinity of a stretch tube of the internal pump shown in FIG. 5;

DETAILED DESCRIPTION OF THE EMBODIMENTS

Figure 1:
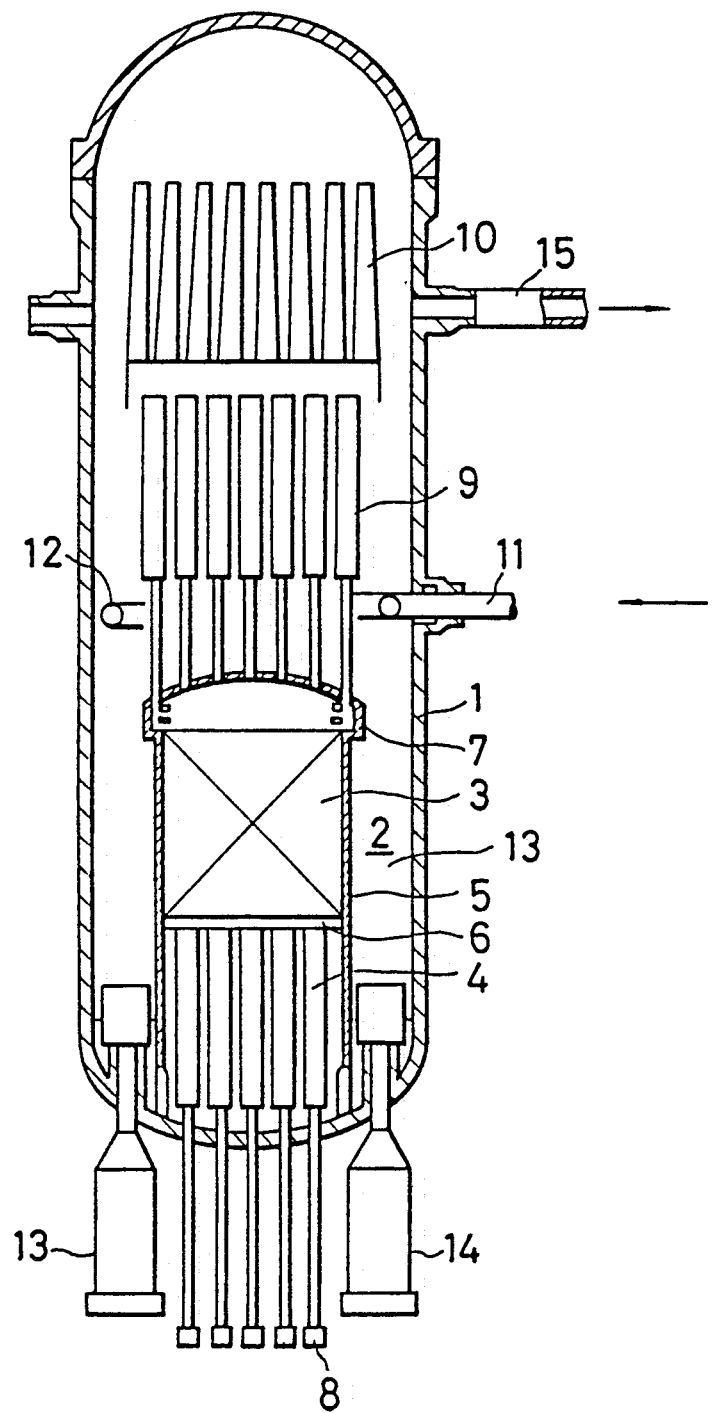
FIG. 1 is a sectional view schematically showing constitution of a general internal pump type boiling water nuclear reactor.
Figure 2:
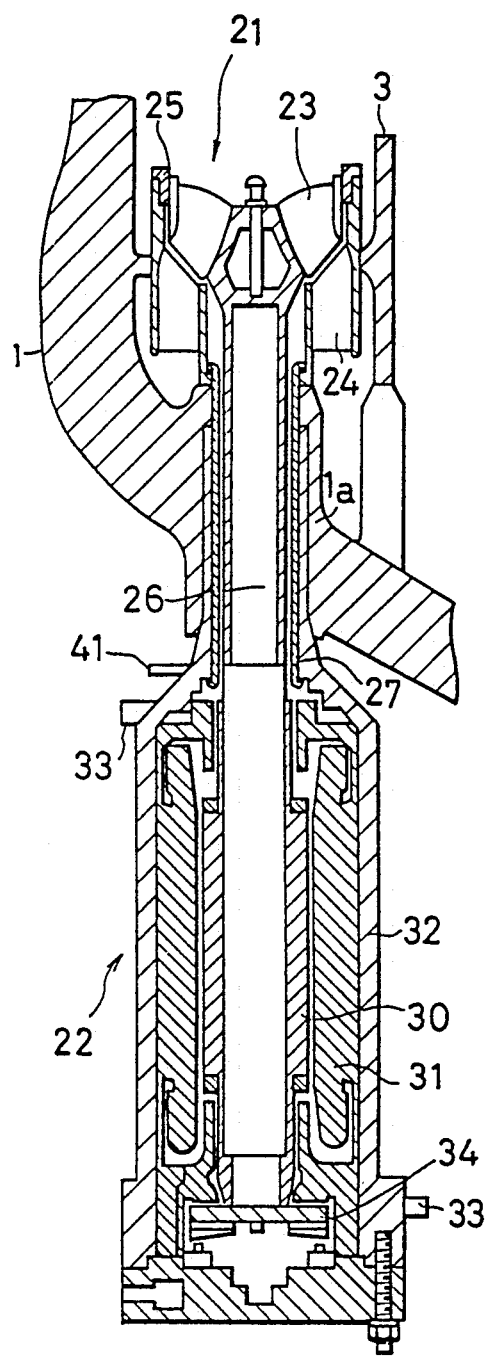
FIG. 2 is a sectional view showing constitution of a conventional internal pump adopted for the reactor of FIG. 1.
Figure 3:
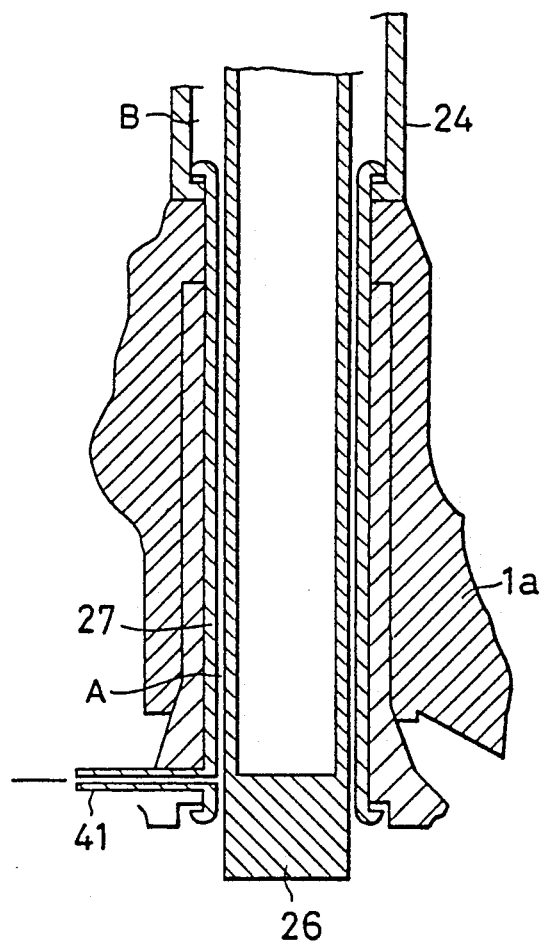
FIG. 3 is an enlarged sectional view showing part of the internal pump shown in FIG. 2.

The first embodiment of the present invention will be explained with reference to FIGS. 4 to 7.

FIG. 5 shows an internal pump of a wet motor type reactor. A reactor pressure vessel 1 is provided with a motor case 32 which is fitted to the outside of the bottom of the pressure vessel 1. Inside the motor case 32, a vertical pump shaft 26 is rotatably supported. A motor 22 is received in the motor case 32. The motor 22 comprises a rotor 30 fixed to the pump shaft 26, and a stator 31 surrounding the rotor 30. To a lower end of the pump shaft 26, an auxiliary impeller 34 is fitted to stir purge water flowing into the motor case 32.

An upper end of the pump shaft 26 passes through a shaft hole 50 which is formed through the bottom of the pressure vessel 1, to protrude in the pressure vessel 1. The upper end of the pump shaft 26 protruding in the pressure vessel 1 is fitted to an impeller 23 for circulating cooling water in the pressure vessel 1. Inside the pressure vessel 1, a diffuser 54 is arranged on the bottom of the pressure vessel 1. The diffuser 54 is positioned downstream the impeller 23 and fixed to an upper end portion of a stretch tube 27. The diffuser 54 has an inner cylinder 52 that surrounds the pump shaft 26. The stretch tube 27 surrounds the pump shaft 26 and, under this condition, inserted into the shaft hole 50. A lower end portion of the stretch tube 27 is fitted to the motor case 32.

As shown in FIG. 6, a purge water inlet 41 is arranged in the middle of the motor case 32. Through the inlet 41, purge water is injected into the motor case 32 and passed through a passage "A" formed between the pump shaft 26 and the stretch tube 27. The purge water is then passed through a passage "B" formed between the pump shaft 26 and the inner cylinder 52 of the diffuser 54, and flows into the pressure vessel 1. The purge water prevents clad in the pressure vessel 1 from entering the motor case 32 as well as cools the inside of the motor case 32.

A boss portion 56 of the impeller 23 is provided with a cover portion 58. The cover portion 58 covers an upper end of the inner cylinder 52 of the diffuser 54 to prevent clad from entering the passage B from the pressure vessel 1.

Figure 4:
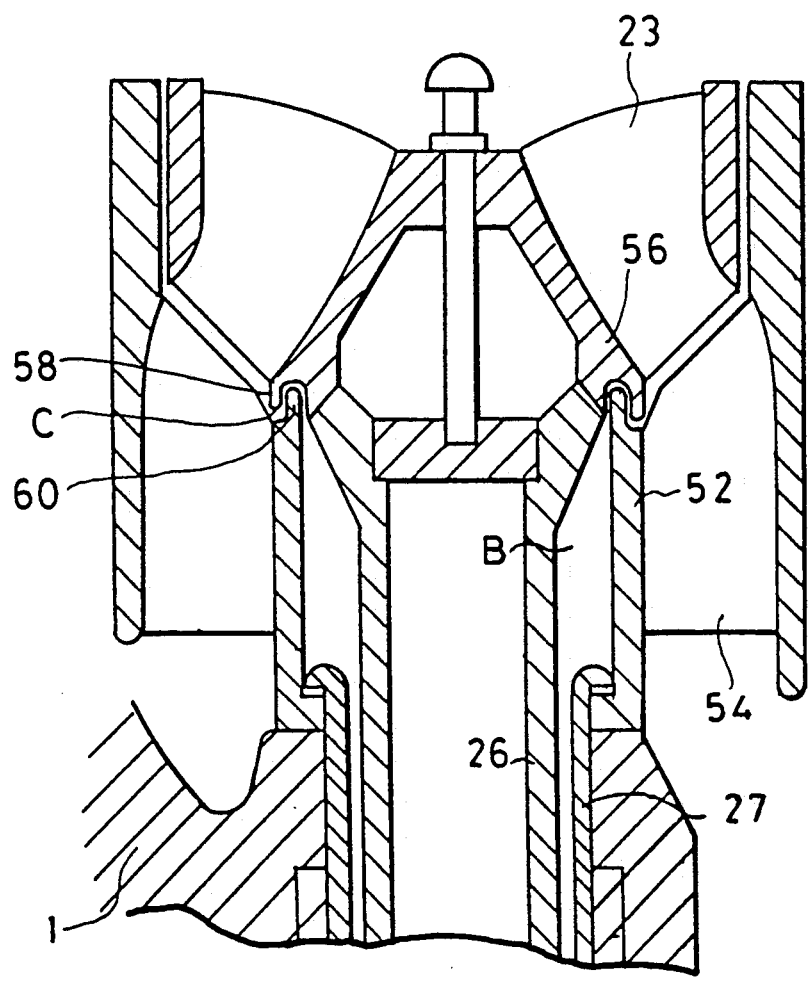
FIG. 4 is a vertical section showing a reactor internal pump according to a first embodiment of the present invention.

In more detail, the periphery of an upper end 60 of the inner cylinder 52 of the diffuser 54 is machined to form a thin cylinder as shown in FIG. 4. The cover portion 58 forms a passage C which extends from the inside of the inner cylinder 52, passes over the upper end 60 and reaches the outside of the inner cylinder 52. The cover portion 58 has a cylindrical cover shape formed integrally with the periphery of the boss portion 56 of the impeller 23.

The cover portion 58 is located at an outermost position on the inner cylinder 52 of the diffuser 54 to pass over the inner cylinder 52 in the direction of a rotation radius of the impeller 23. The passage C is so sized to pass the purge water through the same.

Operation of the embodiment will be described.

When the pump is not operating and whether or not the purge water is being supplied, the cover portion 58 covers the upper end 60 of the inner cylinder 52 of the diffuser 54 to cover the passage B. Therefore, clad which descends in the pressure vessel 1 only by its gravity, never passes through the passage C between the cover portion 58 and the inner cylinder 52 to enter the passage B inside the inner cylinder 52.

When the pump is operated, the clad will move not only by its gravity but also by the flow of pumped water. In this case also, the cover portion 58 effectively acts as a lid to substantially prevent the clad from entering the passage B.

The passage C formed between the inner cylinder 52 of the diffuser 54 and the cover portion 58 is an outlet through which the purge water flows into the pressure vessel 1. The shape of the passage C is tortuous due to the shape of the cover portion 58. Therefore, a pressure loss coefficient of the passage C is very easy to increase compared to the conventional internal pump. If the purge water is supplied, a pressure in the passage B will surely be increased higher than a pressure in the pressure vessel 1, even if a flow rate of the purge water is small. Accordingly, the purge water uniformly flows into the pressure vessel 1 through the passages B and C to prevent clad from flowing from the pressure vessel 1 into the passage B, thus preventing the clad from contaminating the inside of the motor case 32.

Figure 7:
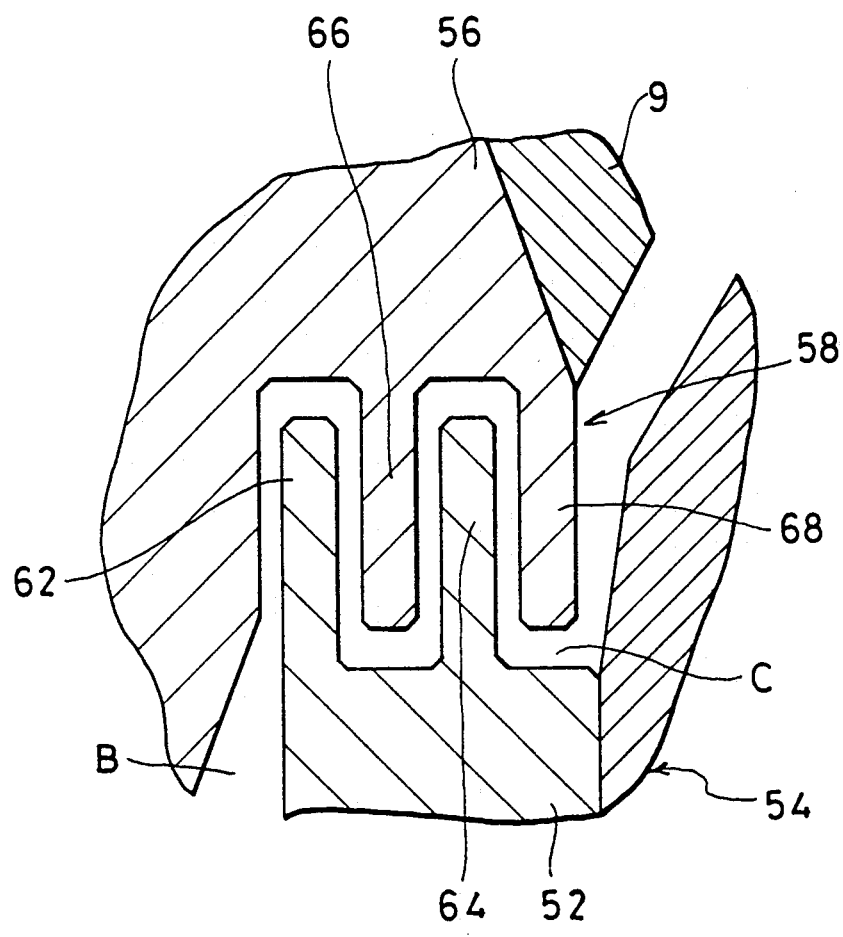
FIG. 7 is a vertical section showing essential part of a modification of the first embodiment.

FIG. 7 is a view showing a modification of the passage C. In this modification, the passage C is further complicated with an upper end of the inner cylinder 52 and the cover portion 58. As shown in the figure, two cylindrical portions 62 and 64 are concentrically formed on the upper end of the inner cylinder 52 of the diffuser 54. The cover portion 58 comprises two concentrical cylinder portions 66 and 68 which are located between the inner and outer cylindrical portions 62 and 64 and outside the outer cylindrical portion 64, respectively. The cover portion 58 is formed integrally with the boss portion 56 of the impeller 23. According to this modification, the shape of the passage C defined by the inner cylinder 52 of the diffuser 54 and the cover portion 58 is further complicated compared to the previous embodiment. As a result, the pressure loss coefficient is further increased to provide a greater clad preventive effect.

The number of the cylindrical portions 62, 64, 66 and 68 may further be increased. The number of the cylindrical portions 62 and 64 of the inner cylinder 52 and the number of the cylindrical portions 66 and 68 of the cover portion 58 are not necessarily to be equal to each other.

As described in the above, the first embodiment of the present invention provides the following effect. Since the cover portion formed on the boss portion of the impeller covers the upper end of the purge water passage formed between the pump shaft and the inner cylinder of the diffuser, clad is prevented from entering the motor case from the reactor pressure vessel through the purge water passage even if a flow rate of the purge water is small or even if there is no flow of the purge water.

Due to this, the inside of the motor case is prevented from being contaminated by the clad in the reactor pressure vessel. As a result, the reliability and safety of the reactor internal pump are improved.

Figure 8:
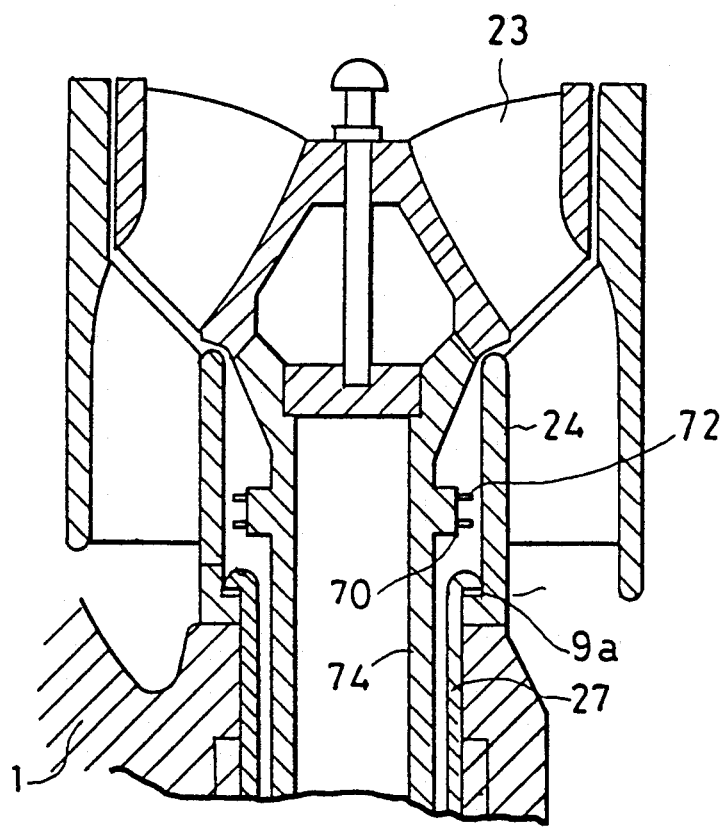
FIG. 8 is a sectional view showing essential part of a second embodiment of the present invention.

The second embodiment of the present invention will be described with reference to FIGS. 8 to 10.

According to the conventional reactor internal motor, a sectional area of the purge water passage upper than the stretch tube 27 is so wide that a velocity of the purge water is slow if a flow rate of the purge water is small. Therefore, clad in the reactor easily enters the area. When the pump is stopped, the pump comes down in an axial direction such that a projection 70 contacts with the top of the stretch tube 27. At the same time, the purge water is stopped and, therefore, an upward flow of the purge water is stopped. Then, clad existing around the upper part of the stretch tube 27 may enter into the motor case whenever the pump is stopped.

Figure 9:
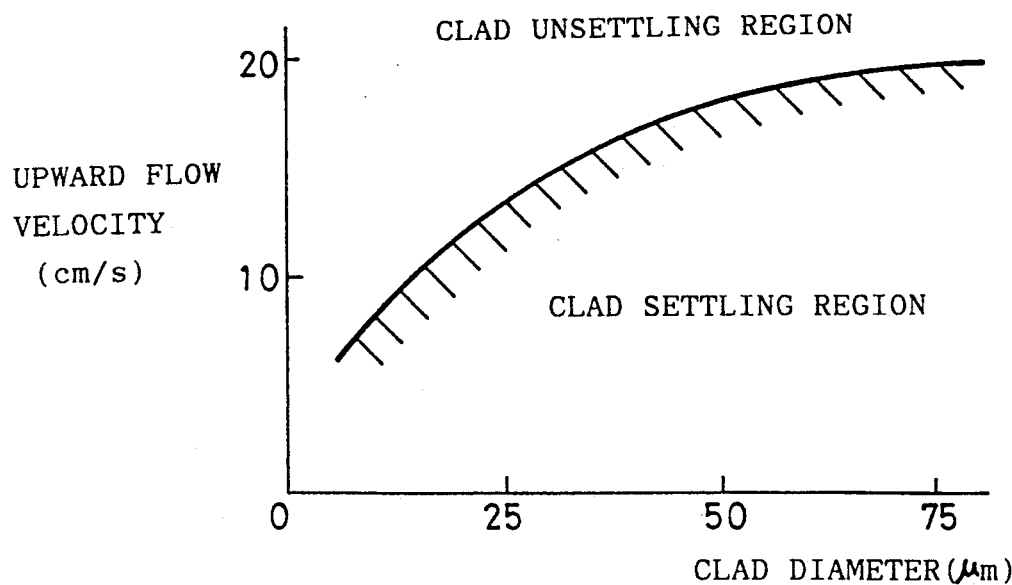
FIGS. 9 and 10 A and B are graphs for explaining the second embodiment.

FIGS. 9 is a graph showing relations between diameters of clad and minimum upward flow velocities that are needed to stop clad from descending. As apparent from the graph, an upward flow velocity of about 20 cm/s, which may differ depending on the diameter of clad, shall be maintained. To satisfy this requirement, the conventional internal pump provides a flow rate of about 40 l/min.

Figure 10B:
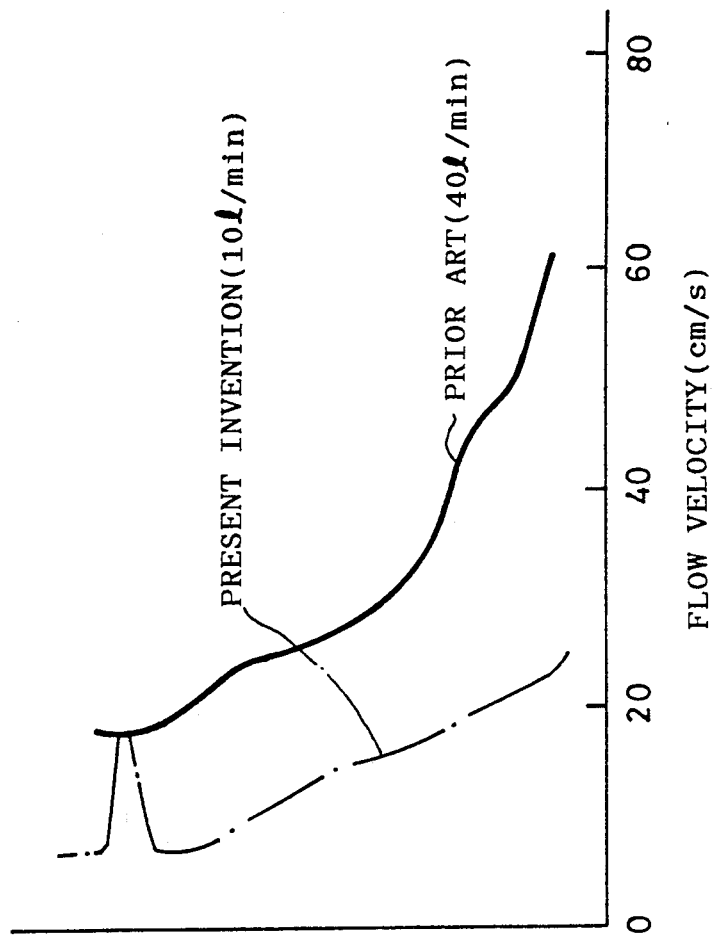
Figure 10A:
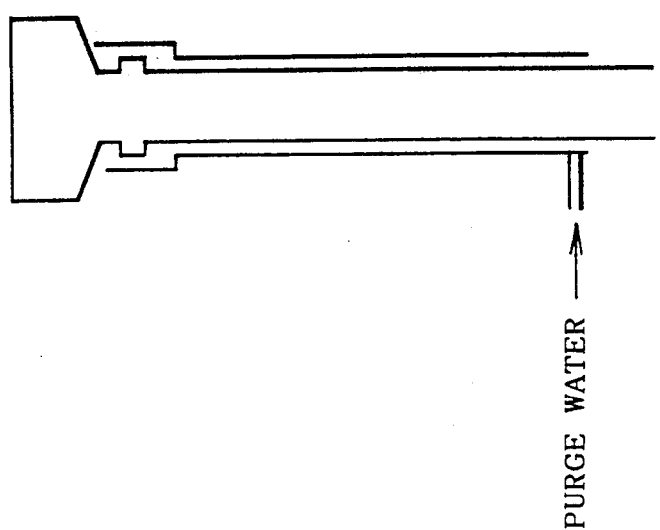

Flow velocities at respective sections of the conventional internal pump are shown in FIG. 10. According to the conventional internal pump, the higher the flow passage, the wider the flow passage, i.e., the slower the flow velocity. The conventional technique generates, therefore, a flow rate of the purge water so as to attain an upward flow velocity of 20 cm/s at an upper end of the passage.

The present invention intends to narrow part of the flow passage. Generally, as shown in FIG. 8, plates 72 are provided on the projection 70. Instead of providing the plates 72 on the projection 70, the plates 72 may be provided on the diffuser or they may be provided on both the projection 70 and diffuser. With these arrangements a local flow velocity at the plates 72 is increased to 20 cm/s. Therefore, even if there exists a location where the flow velocity is less than 20 cm/s, clad will never penetrate a region below the projection 70.

FIG. 10 shows distribution of flow velocities when the plates 72 are provided according to the invention. As shown in the figure, a mean flow velocity of the invention is slower than that of the conventional technique. Therefore, a flow rate of the purge water may be small in the present invention.

Since the small flow rate of purge water is sufficient for the present invention, thermal stress on a pump nozzle due to a cooling effect of the purge water can be minimized.

Although the embodiment has arranged the plates 72 in the vicinity of the projection 70 to narrow the flow passage, the plates 72 may be arranged at any position in the middle of the flow passage or they may be located at plural positions. As a means for narrowing the flow passage, not only the plates but any other means may be adopted. Namely, it is possible to increase the projection height of the projection 70 so as to narrow the flow passage. To improve an effect of the means for narrowing the flow passage, it is preferable to locate them as high as possible. The narrower the flow passage, the higher the flow velocity and the clad preventive effect. However, due to the problem of contact between rotational members and stationary members, a preferable narrowing ratio is ½ to ¼.

As described in the above, the second embodiment of the present invention narrows part of a passage between a stretch tube and a rotor and between a diffuser and the rotor to prevent clad from entering a motor case with purge water of small flow rate.

The third embodiment of the present invention will be described with reference to FIGS. 11 to 16. In the figures, the parts explained before are represented with like numerals to not repeat their explanations.

Figure 11:
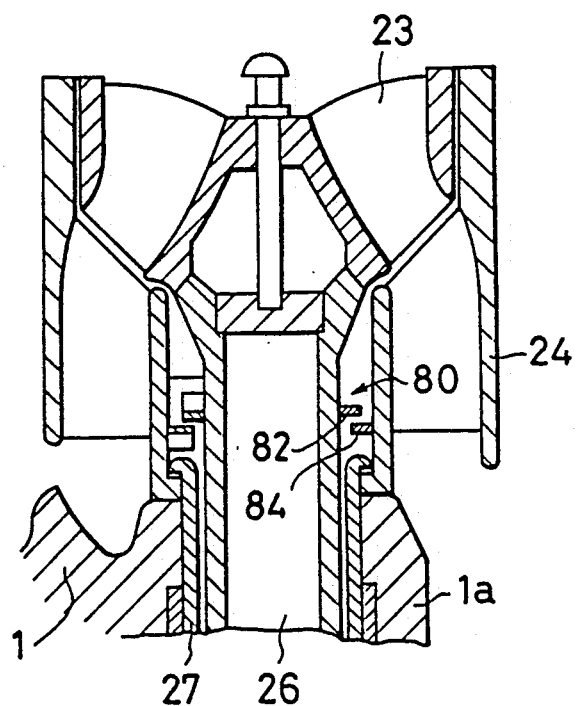
FIG. 11 is a sectional view showing the constitution of an upper part of an internal pump according to a third embodiment of the present invention.

As shown in FIG. 11, between a pump shaft 26 and a diffuser 24, a clad dropping preventive mechanism 80 is disposed. The clad dropping preventive mechanism 80 comprises an annular member 82 protruding outwardly in a radial direction from the pump shaft 26, and an annular member 84 positioned below the annular member 82 and protruding inwardly in the radial direction from the diffuser 24. A projecting length of the annular member 82 is "p1" while a projecting length of the annular member 84 is "p2." A gap between the pump shaft 26 and the diffuser 24 is "g." These figures have the following relation:

$$p1 + p2 > g... \quad (I)$$

Namely, front edge portions of the two annular members 82 and 84 overlap each other in the radial direction. A vertical distance between the two annular members 82 and 84 is "h."

Operation of the embodiment will be explained.

Figure 12:
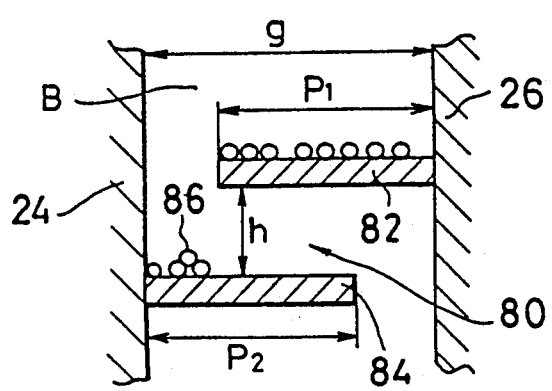
FIGS. 12 and 13 are sectional views showing the constitution and action of a clad dropping preventive mechanism of the third embodiment.

When the pump is not operating, clad 86 of specific gravity larger than that of purge water will settle on the upper surface of the annular members 82 and 84 as shown in FIG. 12, and the clad 86 is restricted from dropping downward farther. Since the front edge portions of the annular members 82 and 84 overlap each other, the clad 86 is trapped in the whole region in the gap between the pump shaft 26 and the diffuser 24. At this time, a passage for purge water is naturally secured.

Figure 13:
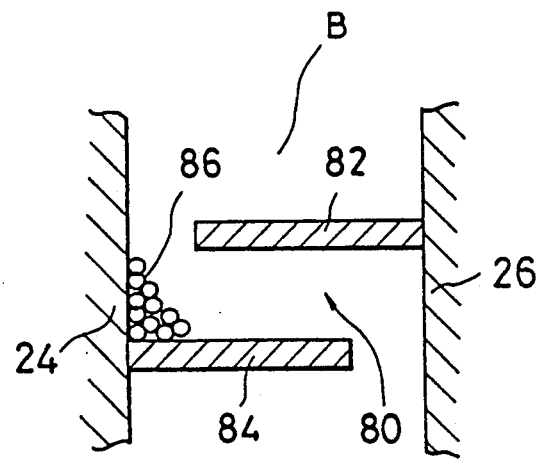

When the pump is operated, a swirling flow of purge water is caused between the pump shaft 26 and the diffuser 24 so that the clad 86 is pushed outward in the radial direction due to centrifugal force and, as shown in FIG. 13, collected at a base of the annular member 84. In this case also, the clad 86 will not fall downward but they are securely collected by the annular member 84.

According to this embodiment, the following effect is provided. The clad dropping preventive mechanism 80 is arranged between the pump shaft 26 and the diffuser 24 to collect the clad 86 dropped from the reactor pressure vessel 1, so that the clad 86 may never enter a motor case 32. Unlike the conventional technique, there is no need to increase a flow rate of the purge water in preventing the clad 86 which has specific gravity larger than that of the purge water. As a result, various problems that may be caused by increasing the flow rate of the purge water will not occur.

The clad dropping preventive mechanism 80 of this embodiment comprises the annular members 82 and 84 protruding from the pump shaft 26 and the diffuser 24, respectively. The front edge portions of the two annular members 82 and 84 overlap each other in the radial direction. Therefore, the whole sectional area of the gap between the pump shaft 26 and the diffuser 24 benefits from a clad collecting function of the annular members 82 and 84. With a higher possibility, the clad is prevented from dropping into the motor case.

According to this embodiment, a required clad preventive function can be realized by only providing a pair of the projecting annular members 82 and 84 so that this embodiment may be easy to apply for existing facilities.

Figure 14:
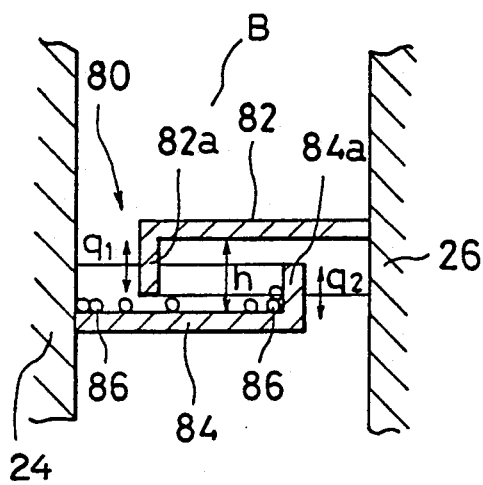
FIG. 14 is a view showing a clad dropping preventive mechanism according to a first modification of the third embodiment.

The first modification of the third embodiment will be described with reference to FIG. 14. In this modification, front edge portions of the annular members 82 and 84 of the third embodiment are bent vertically such that the front edge portions come closer to the other annular member. The projecting lengths of bent portions 82a and 82b are q1 and q2 respectively, and a gap between the annular members 82 and 84 is "h." Then, they have the following relation:

$$q1 + q2 > h... \quad (II)$$

The first modification can provide the similar effect as that of the third embodiment as well as an effect of preventing the clad 86 from dropping more efficiently. This is realized because the front edge portions of the annular members 82 and 84 are provided with the bent portions 82a and 84a, respectively. Particularly when the clad 86 has specific gravity which is larger than that of the purge water, the clad 86 cannot pass over the bent portion 84a. Therefore, even if the internal pump under operation disturbs a flow of the purge water in the passage B, the clad 86 is surely collected.

The front edge portions of the bent portions 82a and 84a are constituted to overlap each other to improve the clad collecting effect.

Figure 15:
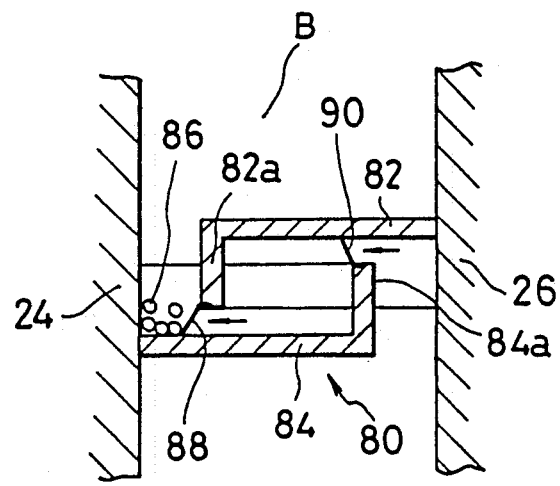
FIG. 15 is a sectional view showing a clad dropping preventive mechanism according to a second modification of the third embodiment.

The second modification of the third embodiment will be explained with reference to FIG. 15.

Between front edge portions of the bent portions 82a and 84a and the annular members 84 and 82 of the first modification, there are arranged non-return valves 88 and 90, respectively. The non-return valves 88 and 90 allow a flow (in the direction of arrow marks shown in FIG. 15) of purge water but stop a flow of the clad 86 in the opposite direction.

The second modification realizes the same action and effect of the first modification as well as an effect of more securely preventing the clad 86 from entering the motor case.

Figure 16:
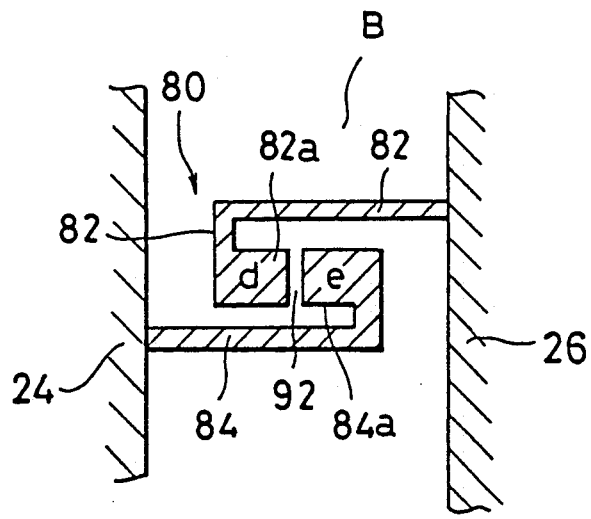
FIG. 16 is a sectional view showing a clad dropping preventive mechanism according to a third modification of the third embodiment.

The third modification of the third embodiment will be explained with reference to FIG. 16.

Front edge portions of the bent portions 82 and 84 of the first modification are further bent in a radial direction to form bent portions 82b and 84b which narrow an area of a passage 92.

According to the third modification, a flow velocity of purge water is increased to more effectively prevent the clad 86 from dropping into the motor case.

According to the second and third modifications, the clad 86 is surely prevented from dropping into the motor case. Therefore, even if a flow of the purge water in the passage B is disturbed to not provide sufficient centrifugal force acting on the clad 86, or even if a quantity of the clad 86 is quite large, the clad 86 may be collected effectively.

The present invention is not limited to the embodiments described before. Any means can be interposed between the pump shaft and the diffuser to prevent the clad from dropping while securing a passage of the purge water. In the first and second modifications, the bent portion or the non-return valve may be provided for only one of the pump shaft and the diffuser.

As described in the above, the reactor internal pump of the third embodiment of the invention can effectively prevent clad from dropping from a reactor pressure vessel into a motor case. Unlike the conventional technique, the third embodiment of the invention does not require a flow rate of purge water to be increased, thus solving various problems caused by increasing the flow rate of the purge water.

A reactor internal pump according to the fourth embodiment of the present invention will be explained with reference to FIGS. 17 to 23. In the figures, parts similar to those of the previously explained pumps are represented with like numerals.

Figure 17:
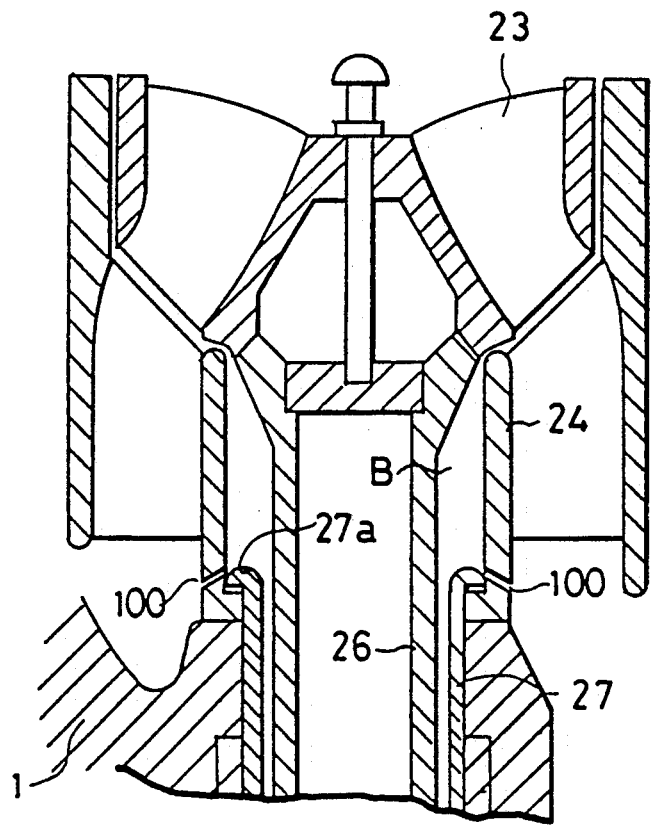
FIG. 17 is a vertical section showing a reactor internal pump according to a fourth embodiment of the present invention.

FIG. 17 shows a fitting portion of a clad discharging mechanism according to the fourth embodiment. An upper end of a pump shaft 26 protrudes inside a reactor pressure vessel 1 and is fixed to an impeller 23. On the downstream side of the impeller 23, a diffuser 24 is arranged. A lower end of the diffuser 24 is fixed to the reactor pressure vessel 1 with an upper end 27a of a stretch tube 27. Between the pump shaft 26 and the diffuser 24, a passage B for purge, water is defined. Where the diffuser 24 is fixed to the upper end 27a of the stretch tube 27, the diffuser 24 is provided with a plurality of small through holes 100.

Figure 18:
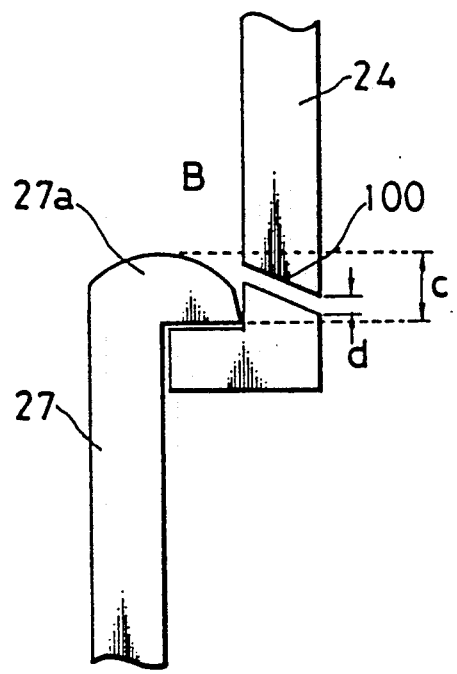
FIG. 18 is a view for explaining a through hole (a clad discharging means) of the forth embodiment.

Details of one of the through holes 100 are shown in FIG. 18. An entrance of the through hole 100 on the inner side of the diffuse 24 is located in a region C. The region C exists between a lower limit at a joint between the upper end 27a of the stretch tube 27 and the diffuser 24 and an upper limit which is a horizontal plane contacting with the top of the upper end 27a of the stretch tube 27. An inner diameter of the through hole 100 is in the range of, for instance, 0.1 mm to 5.0 mm. The through hole 100 is formed through a wall of the diffuser 24. The through hole 100 is horizontal or inclined downward from the passage B toward the outer side of the diffuser 24.

Figure 19:
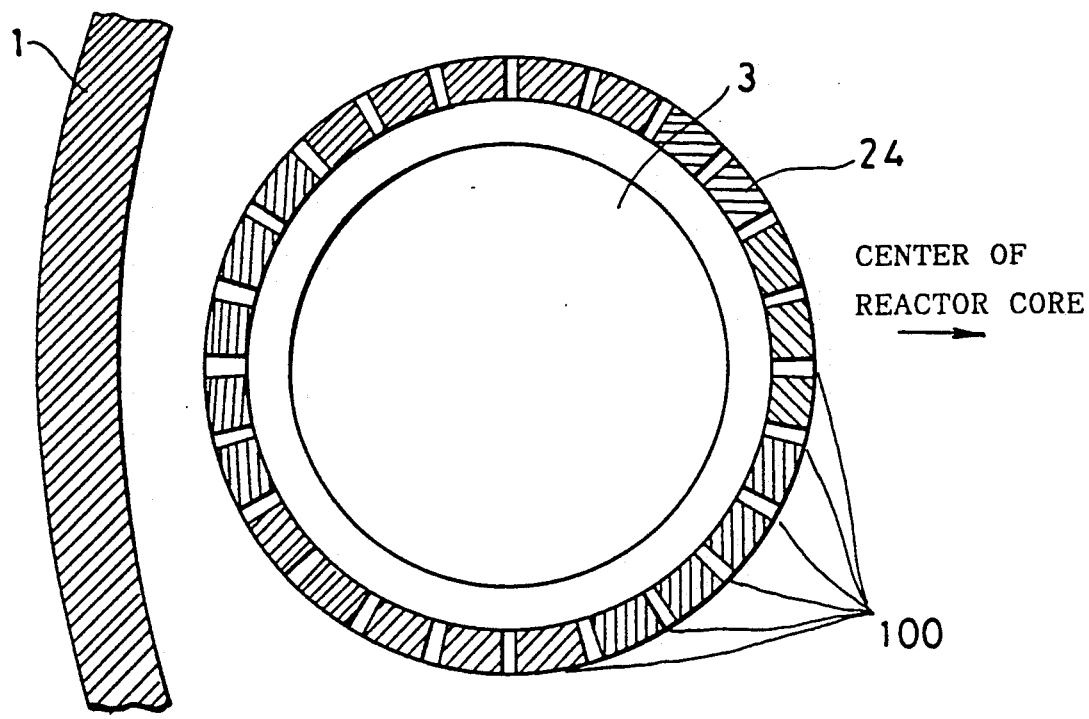
FIG. 19 is a horizontal section showing distribution of the through holes (the clad discharging means) disposed on the circumference of a diffuser of the fourth embodiment.

FIG. 19 is a view showing an example of distribution of the through holes 100 on a circumference of the diffuser 24. The number of the through holes 100 may be, for example, 20 or more that are distributed at regular intervals (at an angle of 18° or less for each through hole) on the circumference of the diffuse 24.

Operation of the internal pump of the embodiment will be explained.

Figure 20:
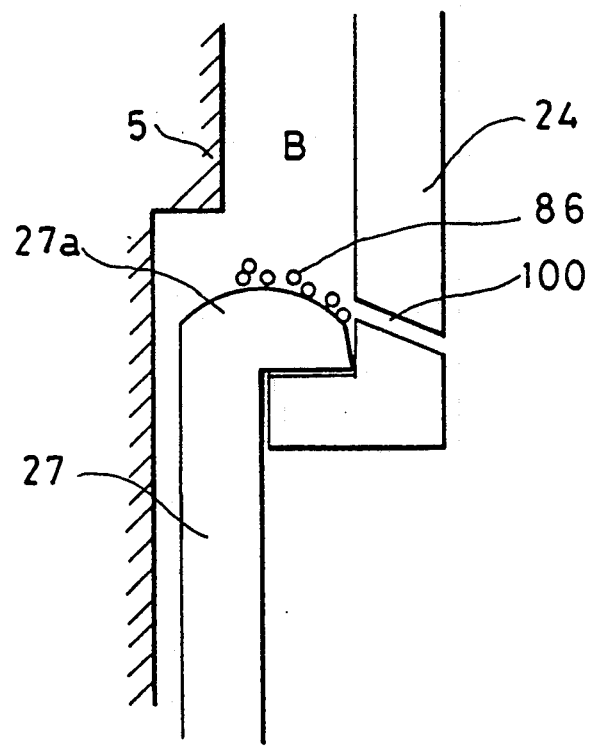
FIGS. 20 to 22 are views for explaining a function of the internal pump of the fourth embodiment.
Figure 21:
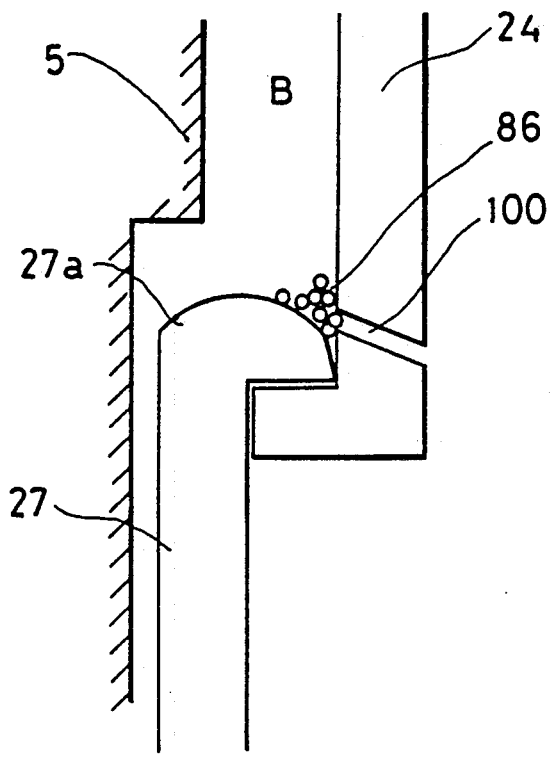
Figure 22:
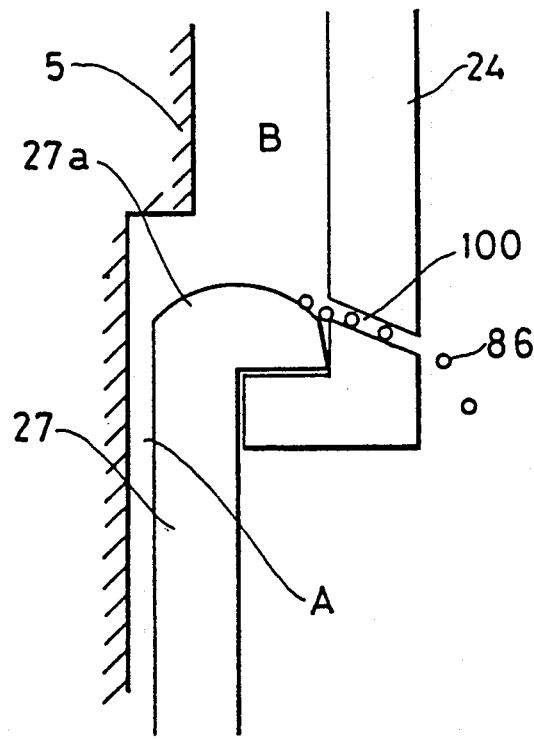

Clad 86 entered the passage B from the reactor pressure vessel 1 has specific gravity larger than that of purge water in the passage B. When the pump is not operating, the clad 86 settles on the upper end 27a of the stretch tube 27 as shown in FIG. 20. When the pump is operated, a circumferential flow of the purge water is generated around the pump shaft 26 in the passage B due to high-speed rotation of the pump shaft 26. As a result, the settled clad 86 is blown toward the diffuser 24 as shown in FIG. 21. Since a pressure in the passage B is higher than that in the reactor pressure vessel 1 outside the diffuser 24, the clad 86 blown toward the diffuser 24 is sucked into the through holes 100 and discharged outside the diffuser 24 as shown in FIG. 22. In this way, the clad 86 entered the passage B is discharged outside the diffuser 24 through the through holes 100 while the pump is rotating. Therefore, the clad 86 never enters a gap A between the stretch tube 27 and the pump shaft 26 or into a motor case 32 located under the gap A.

Figure 23:
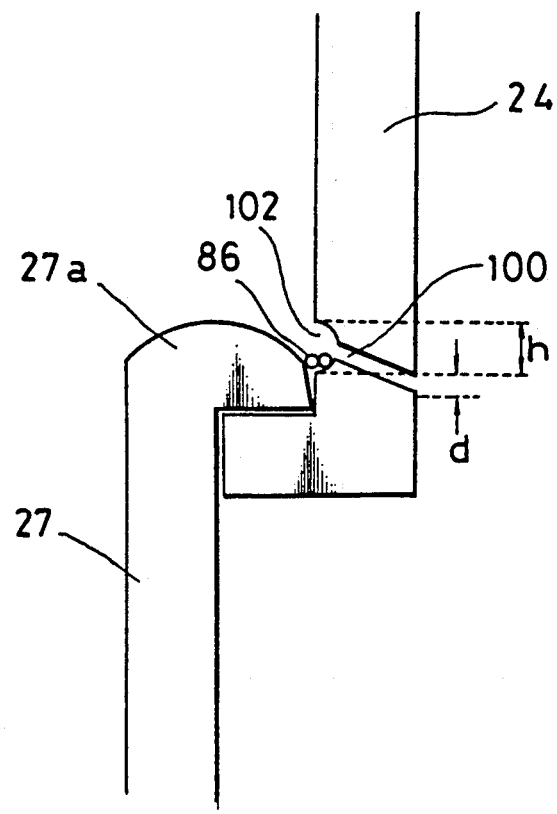
FIGS. 23 to 26 are vertical sections and a horizontal section, showing internal pumps according to first and second modifications of the fourth embodiment.

FIG. 23 is a view showing the first modification of the fourth embodiment. This modification intends to improve an effect of discharging the clad 86 out of the diffuser 24 while the pump is operating. An annular recess 102 is provided on the diffuser 24 in the vicinity of the entrances of the through holes 100. A diameter "h" of the recess 102 is larger than a diameter "d" of each through hole 100, and the diameter is, for example, 1 mm or larger. Other features of the first modification are the same as that of the fourth embodiment. When the pump is operated, the clad 86 is blown toward the diffuser 24 and collected in the recess 102 so that the clad 86 may be discharged more effectively through the through holes 100.

Figure 24:
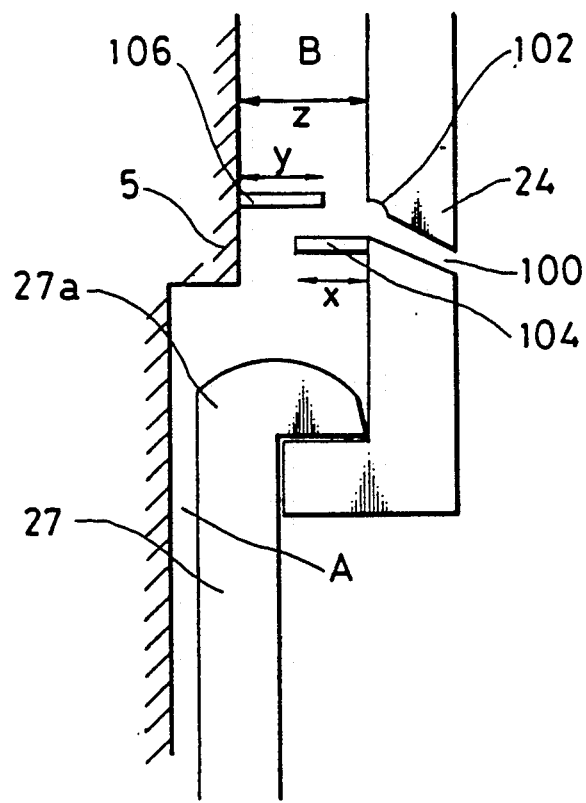

FIGS. 24 shows the second modification of the fourth embodiment. Through holes 100 are positioned on the wall of the diffuser 24 farther above the upper end 27a of the stretch tube 27. An annular recess 102 similar to the one shown in FIG. 23 is formed at entrances of the through holes 100 on the inner side of the diffuser 24. Under the annular recess 102, an annular projection 104 is provided. The annular projection 104 protrudes in the purge water passage B. Above the annular recess 102, an annular projection 106 is provided on the pump shaft 26. The annular projection 106 protrudes in the purge water passage B. A width of the annular projection 104 on the diffuser 24 is "x," while a width of the annular projection 106 on the pump shaft 26 is "y." A width of the purge water passage B is "z.". These figures satisfy the following relation:

$$x+y>z$$

Figure 25:
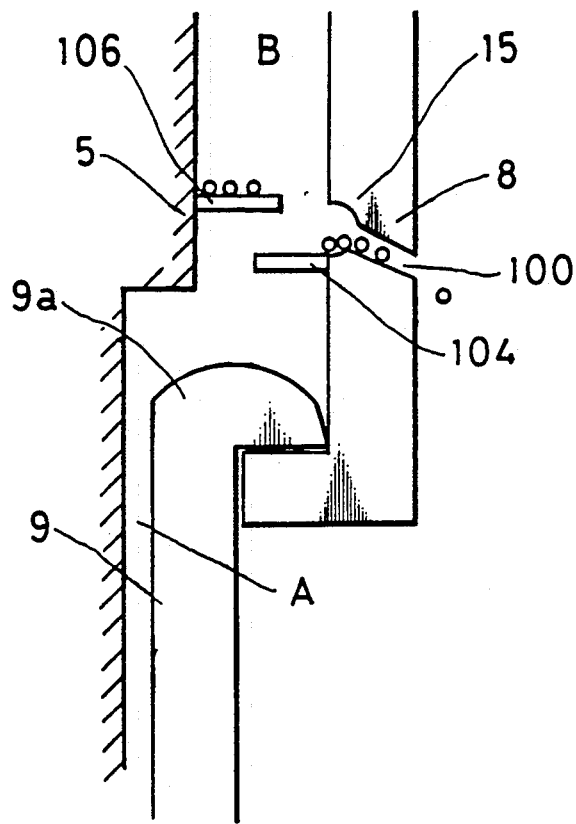

A shape of each through hole 100, distribution of the through holes 100 in the circumferential direction and other features are the same as those of the first modification of the fourth embodiment. As shown in FIG. 25, clad 86 of large specific gravity which has entered the purge water passage B will settle on the annular projections 104 and 106 while the pump is not operating. When the pump is operated, the settled clad 86 is blown toward the annular projection 104 on the diffuser 24 and collected in the annular recess 102. Then the clad 86 is discharged through the through holes 100. Even though the through holes 100 are not provided in contact with the upper end 27a of the stretch tube 27, a clad discharging capacity equivalent to that realized by the through holes 100 of the fourth embodiment is achieved by the second modification. In addition, the second modification will improve freedom of design. The through holes 100 shown in FIG. 24 may be combined with the through holes 100 provided in the vicinity of the upper end 27a of the stretch tube 27 of the fourth embodiment and of the first modification.

Figure 26:
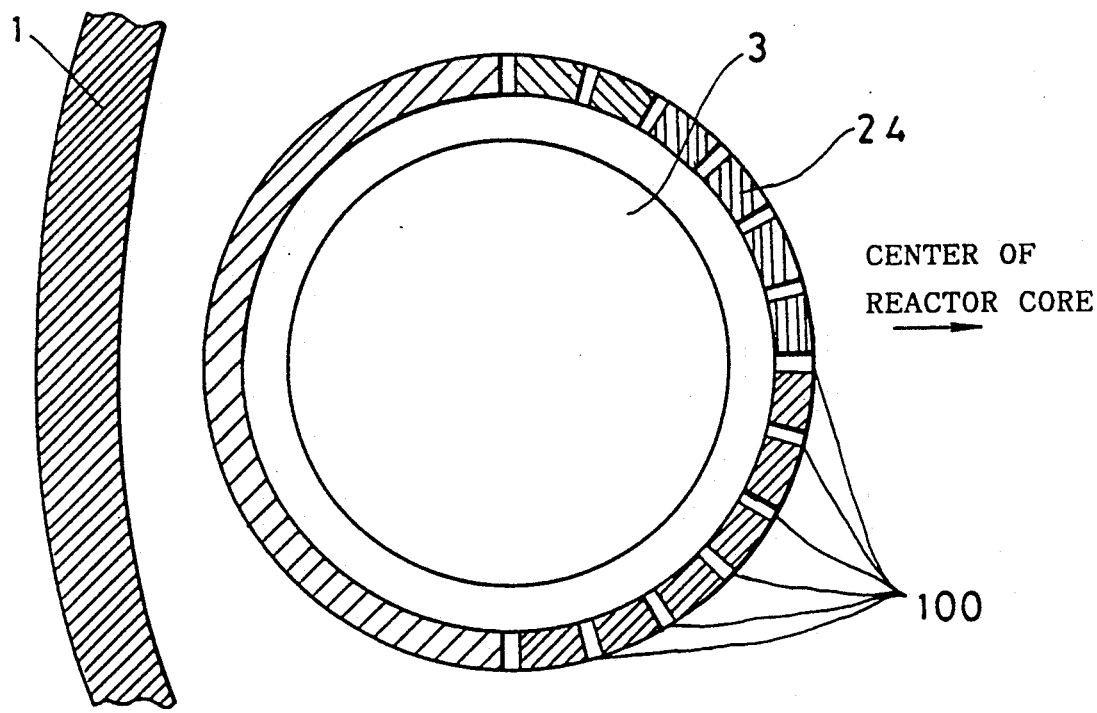

FIG. 26 shows another modification of the present invention in which the through holes 100 are distributed on the circumference of the diffuser 24 only on the side of the center of the reactor pressure vessel 1. Except for the different distribution of the through holes 100 on the circumference of the diffuser 24, the constitution of this modification is the same as that of the fourth embodiment, of the first modification or of the second modification. In FIG. 26, the through holes 100 are arranged at regular intervals only on a half circle portion of the diffuser 24 that faces the reactor core 3. Therefore, the number of the through holes 100 is about a half of that arranged at regular intervals on the whole circumference of the diffuser 24.

A pressure difference between a pressure in the passage B and a pressure in the diffuser 24 will be largest on the reactor core side where the velocity of a discharge flow from the pump outside the diffuser 24 is large. Therefore, a clad discharging capacity of the through holes 100 formed through the diffuser 24 will be highest on the reactor core side. Accordingly, if the through holes 100 are disposed only on the half circle portion of the diffuser 24 on the reactor core side, a sufficient clad discharging capacity will be obtained.

As apparent from the above explanation, even if a flow rate of purge water is small or even if there is no flow of the purge water, the fourth embodiment of the invention can discharge clad which has specific gravity larger than that of the purge water flowing in the passage, to the outside of the diffuser while the pump is rotating. Accordingly, the clad which is radioactive matter generated in the reactor pressure vessel, will never enter the motor case and never contaminate the inside of the motor case, thereby improving the reliability and safety of the internal pump, A reactor internal pump according to the fifth embodiment of the present invention will be described with reference to FIGS. 27 to 31. In the figures, parts which are the same as those explained before are represented with like numerals.

Figure 27:
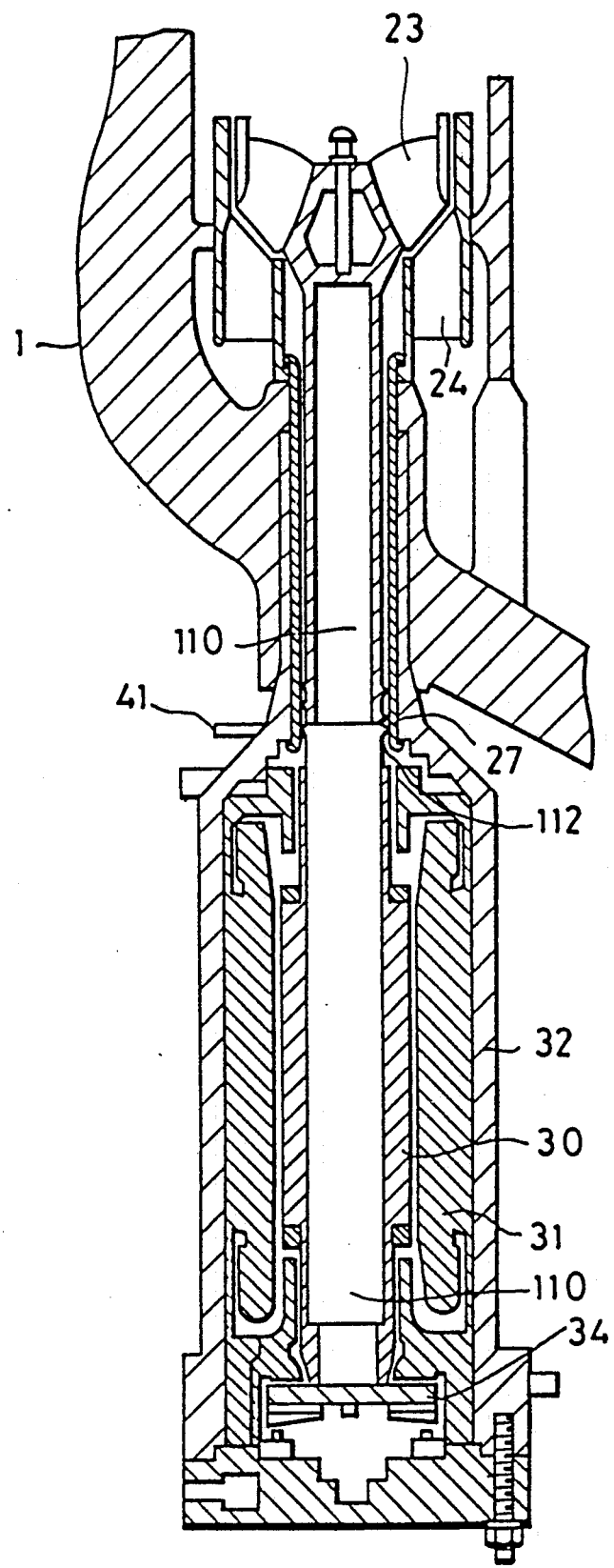
FIG. 27 is a vertical section showing an internal pump according to a fifth embodiment of the present invention.

FIGS. 27 shows a wet motor type internal pump according to the fifth embodiment of the invention. From the bottom of a reactor pressure vessel 1, a motor case 32 is suspended. A motor comprising a rotor 30 and a stator 31 is assembled in the motor case 32. Inside the rotor 30, a pump shaft 110 is integrally fixed. An auxiliary impeller 34 is fixed to a lower end of the rotor 30.

Figure 28:
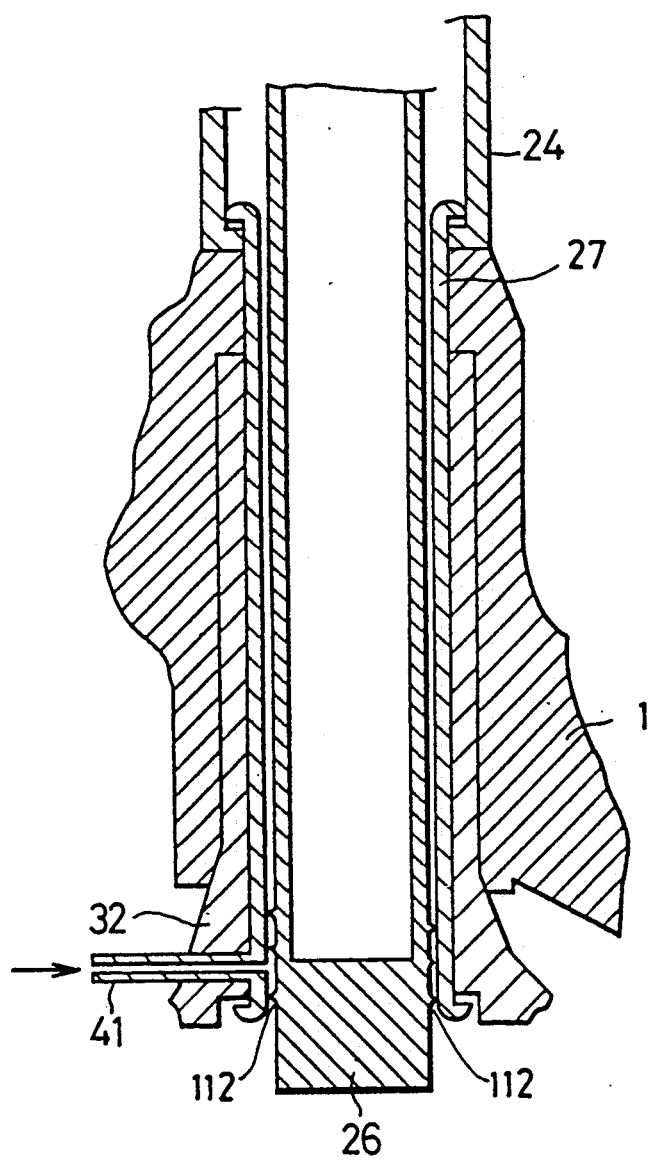
FIG. 28 is an enlarged vertical section showing the vicinity of a stretch tube of the internal pump of the fifth embodiment.

FIG. 28 is a view showing a fitting portion of the internal pump of the embodiment. At an upper end portion of the pump shaft 110 which protrudes inside the reactor pressure vessel 1, there is provided the diffuser 24. The impeller 23 is fixed to the upper end of the pump shaft 110. On the downstream side of the impeller 23, a diffuser 24 is disposed. A lower end portion of the diffuser 24 is fixed to the reactor pressure vessel 1 through a stretch tube 27. Between the pump shaft 26 and the stretch tube 27, a purge water passage is formed. At a lower end of the passage, i.e., in the vicinity of a purge water inlet 41, the pump shaft 26 is provided with several spiral projections 112. Other constitution of this embodiment is the same as that of the conventional internal pump.

Operation of the fifth embodiment of the invention will be explained.

Figure 29:
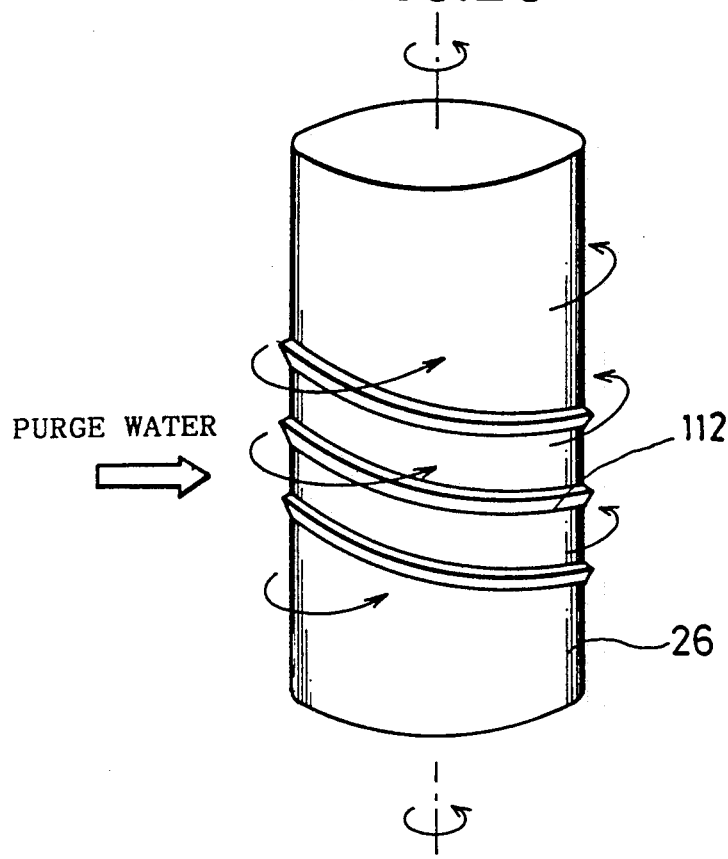
FIG. 29 is a view for explaining a function of the internal pump of the fifth embodiment.

As shown in FIG. 29, when the pump is operated, a swirling flow of purge water is generated in the passage according to rotation of the pump shaft 26, and the spiral projections 112 generate an upward flow of the purge water. Due to the upward flow of swirling purge water, clad is pushed back into the pressure vessel 1 and will never flow into the motor case 32.

Figure 30:
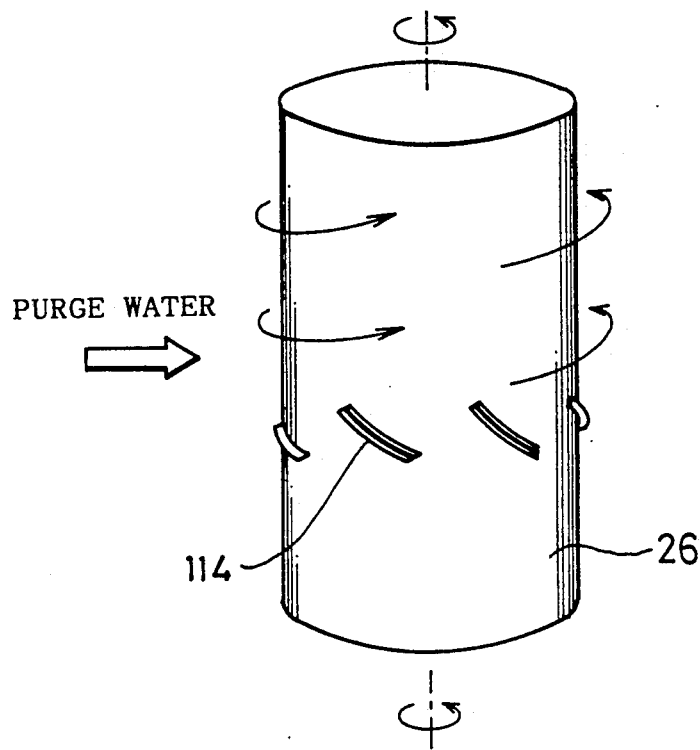
FIG. 30 is a view for explaining a function of an internal pump according to a first modification of the fifth embodiment.

FIG. 30 is a view showing the first modification of the fifth embodiment of the present invention. Instead of the spiral projections 112, vanes 114 are provided to generate an upward flow. This modification can provide the action and effect equivalent to those of the fifth embodiment.

Figure 31:
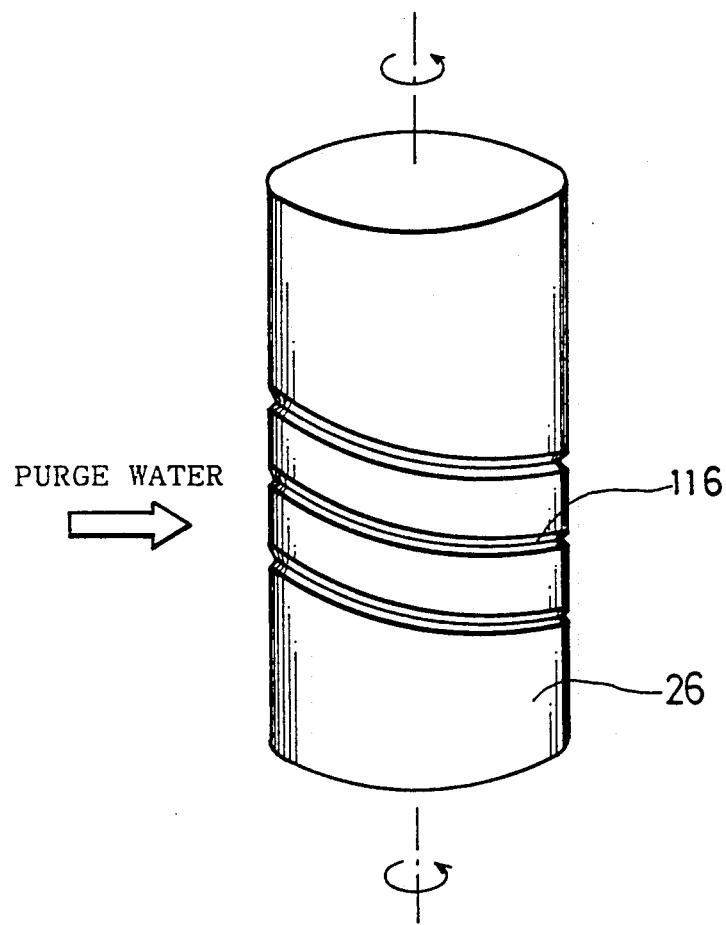
FIG. 31 is a view for explaining a function of an internal pump according to a second modification of the fifth embodiment.

FIG. 31 is a view showing the second modification of the fifth embodiment of the present invention. Instead of the spiral projections 112, spiral grooves 116 are provided on the pump shaft 26 to generate an upward flow. This modification can provide the action and effect equivalent to those of the fifth embodiment. The present invention can prevent radioactive clad in the reactor pressure vessel from contaminating the inside of the motor case, thus improving the reliability and safety of the internal pump.

As apparent from the above explanation, without increasing a flow rate of purge water or even if the flow rate of purge water is decreased due to clogging of purge water injection piping, the fifth embodiment of the invention can prevent powder-like matter (clad) which has specific gravity larger than that of the purge water, from entering a motor case from a reactor pressure vessel. This action can prevent the radioactive clad in the reactor pressure vessel from contaminating the inside of the motor case, thus improving the reliability and safety of a reactor internal pump.

Various modifications will become possible for those skilled in the art after receiving the teachings of the present disclosure without departing from the scope thereof.

What is claimed is:

1. A nuclear reactor internal pump comprising:
   a pump shaft connected to a motor and rotatably passing through the bottom of a nuclear reactor pressure vessel;
   an impeller fitted to a front end portion of the pump shaft;
   a diffuser disposed on the downstream side of the impeller and having an inner cylinder fixed to the bottom of the reactor pressure vessel to surround the pump shaft;
   a purge water passage defined between the pump shaft and the inner cylinder to communicate with the inside of the reactor pressure vessel;
   a purge water supply means for supplying purge water to the reactor pressure vessel through the purge water passage; and
   a clad dropping preventive means, located inside the reactor pressure vessel, for preventing clad from entering the pressure while allowing the purge water to pass through the passage.

2. The nuclear reactor internal pump as claimed in claim 1, wherein said clad entering preventive means comprises a cover portion formed at a base portion of the impeller, the cover portion facing downward and extending in the direction of a rotation radius of the impeller to overlap an upper end of the inner cylinder to prevent the clad from entering the passage while allowing the purge water to pass through the passage.

3. The nuclear reactor internal pump as claimed in claim 2, wherein the cover portion for covering the upper end of the inner cylinder is located on the outermost side of the rotation radius of the impeller.

4. The nuclear reactor internal pump as claimed in claim 1, wherein said clad entering preventive means comprises a means for increasing an upward flow velocity of the purge water at a predetermined part of the passage.

5. The nuclear reactor internal pump as claimed in claim 4, wherein the upward velocity increasing means comprises a projecting plate provided at the predetermined part of the passage to narrow the predetermined part of the passage compared to the front and the rear portions of the predetermined part.

6. The nuclear reactor internal pump as claimed in claim 5, wherein a sectional area of the passage at the predetermined part is narrowed less than one half of that at the front and the rear portions.

7. The nuclear reactor internal pump as claimed in claim 4, wherein the predetermined part is located at an upper part of the passage.

8. A nuclear reactor internal pump comprising:
   a pump shaft connected to a motor and rotatably passing through the bottom of a nuclear reactor pressure vessel;
   an impeller fitted to a front end portion of the pump shaft;
   a diffuser disposed on the downstream side of the impeller and having an inner cylinder fixed to the bottom of the reactor pressure vessel to surround the pump shaft;
   a purge water passage defined between the pump shaft and the inner cylinder to communicate with the inside of the reactor pressure vessel;
   a purge water supply means for supplying purge water to the reactor pressure vessel through the purge water passage; and
   a clad dropping preventive means, located inside the reactor pressure vessel, for trapping clad coming from the reactor pressure vessel in the passage to prevent the clad from dropping.

9. The nuclear reactor internal pump as claimed in claim 8, wherein said clad dropping preventive means comprises an annular member provided on at least one of the pump shaft and the inner cylinder to protrude in the passage to trap the clad with the upper surface of the annular member.

10. The nuclear reactor internal pump as claimed in claim 8, wherein said clad dropping preventive means comprises a first annular member provided on the pump shaft to protrude in the passage outwardly in the direction of a rotation radius of the impeller, and a second annular member provided on the inner cylinder below the first annular member to protrude in the passage inwardly in the direction of the rotation radius of the impeller.

11. The nuclear reactor internal pump as claimed in claim 8, wherein said clad dropping preventive means comprises a clad discharging means for discharging the trapped clad outside the diffuser.

12. The nuclear reactor internal pump as claimed in claim 11, wherein the clad discharging means comprises through holes each formed through the inner cylinder to connect the inside and the outside of the inner cylinder to each other and having a diameter larger than diameters of the clad.

13. The nuclear reactor internal pump as claimed in claim 12, wherein the through holes are inclined downward from the inside toward the outside of the inner cylinder.

14. The nuclear reactor internal pump as claimed in claim 12, wherein the through holes are horizontally extended from the inside toward the outside of the inner cylinder.

15. A nuclear reactor internal pump comprising:
   a motor case with its top end inserted into a reactor pressure vessel through a lower portion of the reactor pressure vessel;
   a pump shaft disposed inside said motor case and having an upper end portion disposed inside the reactor pressure vessel;
   an impeller fixed to the upper end portion of the pump shaft;
   a diffuser arranged on the discharge side of said impeller;
   a stretch tube arranged around and spaced apart from said pump shaft and having an upper end fixing said diffuser to the reactor pressure vessel;
   a purge water supply port connected to said motor case to supply purge water into a space between said pump shaft and said stretch tube and into a space between said pump shaft and said diffuser; and
   a clad discharging means provided on said diffuser for discharging clad insaid said diffuser to outside said diffuser to cause clad to remain inside the reactor pressure vessel.

16. The nuclear reactor internal pump as claimed in claim 15, wherein the clad discharging means comprises through holes each formed through an inner cylinder of said diffuser to connect the inside and the outside of the inner cylinder to each other and having a diameter larger than diameters of the clad.

17. The nuclear reactor internal pump as claimed in claim 16, wherein the through holes are inclined downward from the inside toward the outside of the inner cylinder.

18. The nuclear reactor internal pump as claimed in claim 16, wherein the through holes are horizontally extended from the inside toward the outside of the inner cylinder.

19. A nuclear reactor internal pump comprising:
   a pump shaft connected to a motor and rotatably passing through the bottom of a nuclear reactor pressure vessel;
   an impeller fitted to a front end portion of the pump shaft;
   a diffuser disposed on the downstream side of the impeller and having an inner cylinder fixed to the bottom of the reactor pressure vessel to surround the pump shaft;
   a purge water passage defined between the pump shaft and the inner cylinder to communicate with the inside of the reactor pressure vessel;
   a purge water supply means for supplying purge water to the reactor pressure vessel through the purge water passage; and
   a swirling flow generating means for generating a swirling flow of purge water in the purge water passage in response to rotation of the pump shaft to cause clad to remain inside the reactor pressure vessel.

20. The nuclear reactor internal pump as claimed in claim 19, wherein said swirling flow generating means comprises spiral projections formed on the pump shaft.

21. The nuclear reactor internal pump as claimed in claim 19, wherein said swirling flow generating means comprises vanes formed on the pump shaft.

22. The nuclear reactor internal pump as claimed in claim 19, wherein said swirling flow generating means comprises spiral grooves formed on the pump shaft.

* * * * *